(12) United States Patent
Nichols et al.

(10) Patent No.: US 7,584,368 B2
(45) Date of Patent: Sep. 1, 2009

(54) APPARATUS AND METHODS FOR POWER MANAGEMENT AND SPIN-UP IN A STORAGE SYSTEM

(75) Inventors: Charles E. Nichols, Wichita, KS (US); Drew M. Marti, Fort Collins, CO (US); William G. Deitz, Niwot, CO (US)

(73) Assignee: LSI Corporation, Milpitas, CA (US)

( * ) Notice: Subject to any disclaimer, the term of this patent is extended or adjusted under 35 U.S.C. 154(b) by 471 days.

(21) Appl. No.: 11/355,631

(22) Filed: Feb. 16, 2006

(65) Prior Publication Data

US 2007/0192639 A1 Aug. 16, 2007

(51) Int. Cl.
*G06F 1/00* (2006.01)
(52) U.S. Cl. ........................................ 713/300; 711/114
(58) Field of Classification Search ................. 713/300; 711/114
See application file for complete search history.

(56) References Cited

U.S. PATENT DOCUMENTS

| 6,408,394 | B1 * | 6/2002 | Vander Kamp et al. ..... 713/300 |
| 6,915,363 | B2 * | 7/2005 | Wood et al. ................. 710/74 |
| 7,242,656 | B2 * | 7/2007 | Kamo et al. ............... 369/53.3 |
| 7,305,572 | B1 * | 12/2007 | Burroughs et al. .......... 713/300 |
| 7,370,220 | B1 * | 5/2008 | Nguyen et al. .............. 713/330 |
| 2003/0212857 | A1 * | 11/2003 | Pacheco et al. ............. 711/114 |
| 2004/0025070 | A1 * | 2/2004 | Yuan .......................... 713/330 |
| 2004/0107313 | A1 * | 6/2004 | Kamo et al. ................. 711/114 |
| 2005/0108588 | A1 * | 5/2005 | Yuan .......................... 713/330 |
| 2005/0185374 | A1 * | 8/2005 | Wendel et al. .............. 361/685 |
| 2006/0294269 | A1 * | 12/2006 | Duerk et al. .................. 710/62 |
| 2007/0058279 | A1 * | 3/2007 | Duerk et al. .................. 360/69 |

\* cited by examiner

*Primary Examiner*—Thomas Lee
*Assistant Examiner*—Vincent T Tran
(74) *Attorney, Agent, or Firm*—Duft Bornsen & Fishman LLP (57) ABSTRACT

Apparatus and methods for controllably spinning up disk drives in a storage system. A storage system includes a first portion of disk drives that support controllable sequencing of disk drive spin-up and a second portion that do not support controllable sequencing of spin-up. Disk drives in the first portion are configured to be powered on with the storage system and are controllably spun up by issuing appropriate commands to each disk drive. Disk drives in the second portion are configured initially powered off when the storage system is powered on and have power controllably applied thereto to cause spin-up of each disk drive. Disk drives in the first portion may include SAS disk drives and SATA disk drives that support staggered spin-up features. Disk drives in the second portion may include SATA disk drives that do not support staggered spin-up.

19 Claims, 6 Drawing Sheets

APPARATUS AND METHODS FOR POWER MANAGEMENT AND SPIN-UP IN A STORAGE SYSTEM

BACKGROUND OF THE INVENTION

1. Field of the Invention

The invention relates generally to serial attached SCSI ("SAS") domains and more specifically to apparatus and methods for improved power management and spin-up of drives in a system adapted to use both SAS and Serial AT Attached ("SATA") disk drives.

2. Discussion of Related Art

Small Computer Systems Interface ("SCSI") is a SATA American National Standards Institute ("ANSI") standard electronic interface specifications that allow, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol ("SSP").

SCSI interface transports and commands are also used to interconnect a plurality of storage devices in a storage subsystem with processing devices. For example, serial SCSI transport media and protocols such as SAS as well as SATA protocol exchanges may be used in such storage subsystems. Those skilled in the art are familiar with SAS and SATA standards as well as other SCSI related specifications and standards. Information about such interfaces and commands is generally obtainable at a number of websites including, for example, http://www.t10.org, at http://www.t13.org, and at http://www.serialata.org.

Such storage subsystems using SAS and SATA compliant storage devices are often used in large storage systems having a plurality of disk drives to store data for organizations and/or businesses. The switched serial connectivity architecture of SAS and SATA allows storage devices to be physically dispersed in an enterprise while continuing to directly support SCSI exchanges and ATA exchanges. This architecture allows for distribution of the storage components in an enterprise without the need for added overhead in converting storage requests from SCSI/ATA into other application layer network exchanges and then back into lower level SCSI/ATA storage related commands.

A SAS storage system typically comprises one or more SAS initiators coupled to one or more SAS targets often via one or more SAS expanders. In general, as is common in all SCSI communications, SAS initiators initiate communications with SAS targets. The expanders expand the number of ports of a SAS domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

A variety of protocols are defined in the SAS standards each useful for communications with particular types of devices and/or for particular applications. Serial SCSI Protocol ("SSP") provides a mapping of SCSI exchanges supporting multiple initiators and targets. Serial ATA Tunneled Protocol ("STP") provides a mapping of Serial ATA expanded to support multiple initiators and targets. Serial Management Protocol ("SMP") provides a management protocol. Each protocol defines layers of exchanges including, for example, application layer processing, transport layer processing, and link layer processing. For example, in general, STP is used in communicating with SATA devices coupled to the SAS domain. An STP initiator (e.g., a host system or a SAS expander) exchanges information with an STP target (e.g., a SATA storage device) using the STP link layer. The STP link layer generally encapsulates SATA related exchanges and flow control into SAS domain exchanges. Or, for example, SSP is used in communicating with SCSI devices coupled to the SAS domain. An SSP initiator exchanges information with an SSP target using the SSP link layer, transport layer, etc.

When any disk drive is initialized, one aspect of that initialization is spin-up of the disk rotating platters within the disk drive. This spin-up aspect of disk drive initialization draws a significant amount of electrical current (relative to the normal steady state spinning operation of the disk drive). In large storage systems having a large number of disk drives it is important to sequence the spin-up of the disk drives in the system to avoid a large aggregate current draw from all disk drives of the system simultaneously spinning up. Such a large current draw requires larger, more expensive power supplies in the storage system that provide the current source required for simultaneous spin-up of all disk drives in the large storage system. Thus, SAS disk drives in particular are specified to permit controlled sequencing of the spin-up of the disk drive platters. A controller in the storage system may thereby controllably sequence the spin-up of all SAS drives in the system. Where the system includes only SAS disk drives, controlled spin-up sequencing is an inherent capability in accordance with the SAS (e.g., SCSI) specifications. SATA devices do not, in general, support such a sequenced initialization as an inherent aspect of the SATA specifications. However, if a storage system includes a heterogeneous mix of SAS device (supporting sequential spin-up) and SATA devices (that do not support sequential spin-up, a problem may arise in that all SATA disk drives in the system may spin-up substantially simultaneously upon application of power thereto. Thus the problem of excessive current draw during spin-up may still arise where a storage system includes a heterogeneous mix of both SAS and SATA disk drives.

It is evident from the above discussion that a need exists for an improved structure and method for initializing disk drives in a storage system supporting a heterogeneous mix of disk drives some of which support controllable spin-up and others that do not.

SUMMARY OF THE INVENTION

The present invention solves the above and other problems, thereby advancing the state of the useful arts, by providing apparatus and methods for controlled sequencing of spin-up of disk drives in a storage system adapted to support both SAS and SATA drives.

A feature hereof provides a method of sequencing the spin-up of a plurality of disk drives in a storage system, the method comprising: configuring a first portion of the disk drives to be powered on when the storage system is powered on; configuring a second portion of the disk drives to be initially powered off when the storage system is powered on; issuing a spin-up command to each disk drive in the first portion; and controllably applying power to each disk drive in the second portion to cause each disk drive in the second portion to spin-up.

Another aspect hereof further provides that the step of issuing further comprises issuing spin-up commands to effectuate spinning-up of at most a number of disk drives N in the first portion over any predetermined period of time of duration M.

Another aspect hereof further provides that the step of controllably applying power further comprises controllably applying power to each disk drive in the second portion such that at most N disk drives in the second portion spin-up over any period of time of duration M.

Another aspect hereof further provides for performing a discovery process to identify each disk drive in the first portion.

Another aspect hereof further provides that the step of issuing is performed in cooperation with the step of performing a discovery process.

Another aspect hereof further provides that the step of performing a discovery process identifies one or more SAS disk drives, and provides that the step of issuing further comprises issuing a NOTIFY (ENABLE spin-up) primitive to each identified SAS disk drive in the first portion.

Another aspect hereof further provides that the step of performing a discovery process identifies one or more SATA disk drives, and provides that the step of issuing further comprises applying a COMWAKE out of band signal to each identified SATA disk drive in the first portion.

Another aspect hereof further provides that the plurality of disk drives comprises one or more SATA disk drives and provides that each SATA disk drive is coupled to a SATA interposer with a programmable power switch adapted to controllably apply power to the SATA disk drive coupled thereto, and provides that the step of configuring the first portion of the plurality of disk drives further comprises configuring the programmable power switch of each SATA interposer coupled to a SATA disk drive in the first portion to be initially on, and provides that the step of configuring the second portion of the plurality of disk drives further comprises configuring the programmable power switch of each SATA interposer coupled to a SATA disk drive in the second portion to be initially off, and provides that the step of controllably applying power further comprises controllably switching on the programmable power switch of each SATA interposer coupled to a SATA disk drive of the second portion.

Another feature hereof provides a storage system comprising: a storage controller; and a serial attached SCSI ("SAS") expander coupled to the storage controller; and a plurality of disk drives each coupled to the SAS, the plurality of disk drives including a first portion configured to have power applied when the system is powered on, the plurality of disk drives further including a second portion configured to remain initially powered off when power is applied to the system, and provides that the system is adapted to issue a spin-up command to each disk drive in the first portion and is further adapted to controllably apply power to spin-up each disk drive in the second portion.

Another aspect hereof further provides that the system is further adapted to issue a spin-up command to at most a number of disk drives N over a predetermined period of time of duration M.

Another aspect hereof further provides that the system is further adapted to controllably apply power to each disk drive in the second portion such that at most N disk drives spin-up over time of duration M.

Another aspect hereof further provides that the plurality of disk drives includes one or more SAS disk drives and includes one or more serial ATA ("SATA") disk drives, and provides that the system is adapted to perform a SAS discovery process to identify SAS disk drives and SATA disk drives in the plurality of disk drives, and provides that the system further comprises a one or more SATA interposers each coupled to a corresponding SATA disk drive of the plurality of disk drives and coupled to the SAS expander and provides that each interposer includes a programmable power switch adapted to controllably apply power to the corresponding SATA disk drive.

Another aspect hereof further provides that the system is adapted to issue a NOTIFY (ENABLE spin-up) primitive to each SAS disk drive in the first portion, and provides that the system is further adapted to apply a COMWAKE out of band signal to each SATA disk drive in the first portion, and provides that the system is further adapted to controllably program the power switch of each interposer coupled to a SATA disk drive in the second portion to controllably apply power to each SATA disk drive in the second portion.

Another feature hereof provides a method operable in a storage system having a serial attached SCSI ("SAS") storage controller coupled to a plurality of disk drives including at least one SAS disk drive and at least one serial ATA ("SATA") disk drive, the plurality of disk drives comprising a first portion of disk drives that support controlled spin-up following power-up and a second portion of disk drives that do not support controlled spin-up following power-up, the method comprising: performing a SAS discovery process to identify disk drives in the storage system such that each disk drive in the first portion is controllably spun up during the discovery process; and controllably powering up the disk drives in the second portion following completion of the discovery process.

Another aspect hereof further provides that the storage system comprises a SAS storage controller and a SAS expander, and provides that the step of performing a SAS discovery process is performed within the SAS expander, and provides that the step of controllably powering up is performed within the SAS storage controller.

Another aspect hereof further provides that the storage system includes at least one SATA interposer such that each SATA disk drive of the storage system is coupled to a corresponding SATA interposer, each interposer including a programmable power switch configurable to apply power to the corresponding SATA disk drive when power is applied to the SATA interposer and configurable to await instruction from the storage controller to apply power to the corresponding SATA disk drive, and provides that the step of controllably powering up the disk drives in the second portion further comprises instructing the SATA interposer coupled to each SATA disk drive in the second portion to apply power to its corresponding SATA disk drive to spin-up its corresponding SATA disk drive.

Another aspect hereof further provides that the step of performing a SAS discovery process further comprises: identifying each disk drive in the first portion as either a SAS disk drive or a SATA disk drive supporting staggered spin-up; issuing a NOTIFY (ENABLE spin-up) primitive to each SAS disk drive in the first portion; and applying a COMWAKE out of band signal to each SATA disk drive in the first portion to cause spin-up of each SATA disk drive.

Another aspect hereof further provides that each SATA disk drive of the plurality of disk drives is coupled to a SATA interposer having a programmable switch to apply power to the attached SATA disk drive and configurable to apply power to the attached SATA disk drive when power is applied to the interposer and configurable to await instruction from the storage controller to apply power to the attached SATA disk drive, and provides that the method further comprises: configuring all SATA interposers coupled to SATA disk drives in the first portion to apply power to the attached SATA drive when power is applied to the SATA interposer; and configuring all SATA interposers coupled to SATA disk drives in the second portion to await instruction from the storage controller to apply power to the attached SATA disk drive.

Another aspect hereof further provides that the steps of performing a SAS discovery process and of controllably applying power result in no more than a number N disk drives being spun up during any time period of duration M.

Another aspect hereof further provides that N and M are configurable values in the storage system.

DETAILED DESCRIPTION OF THE DRAWINGS

Figure 1:
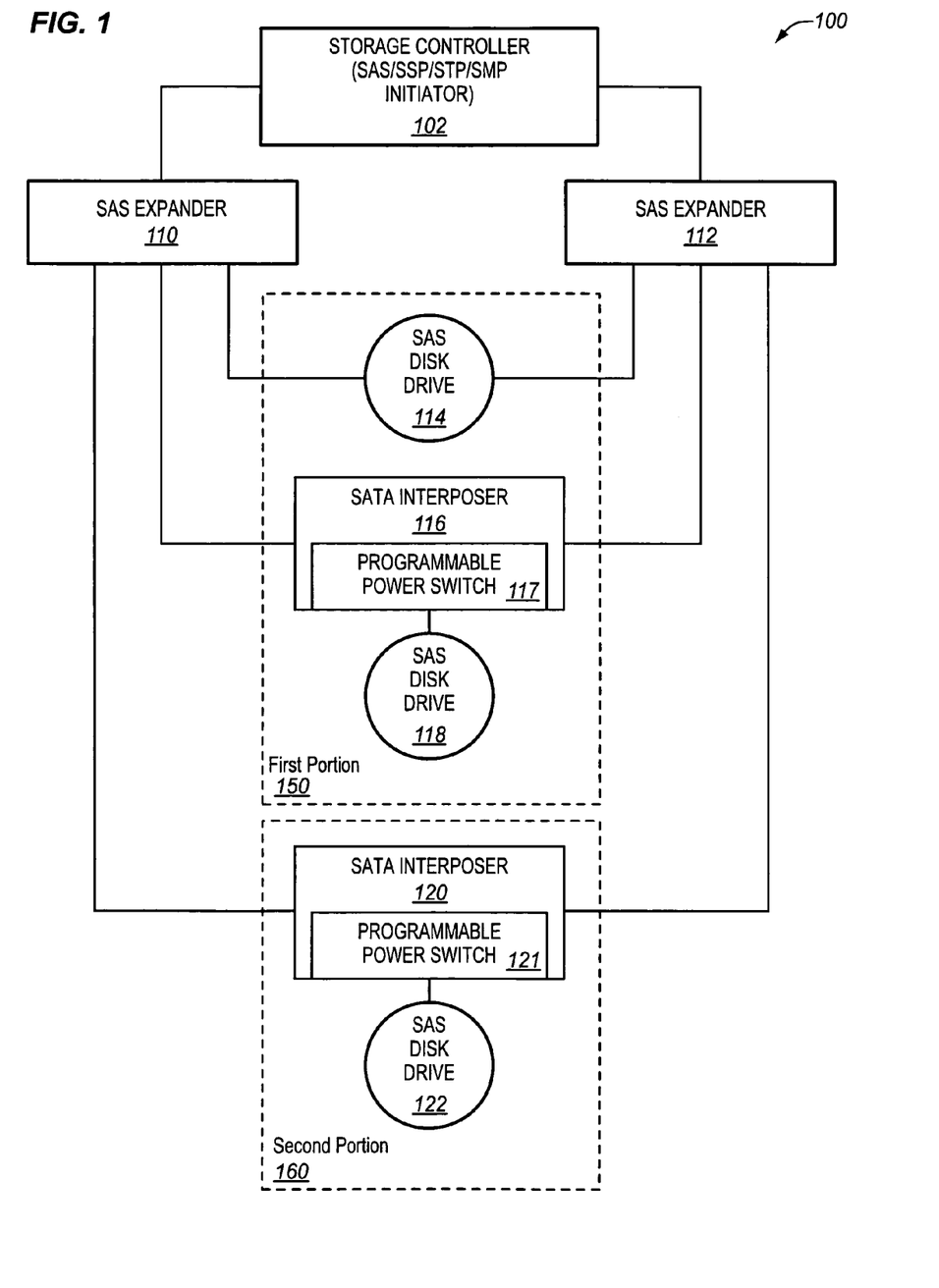
FIG. 1 is a block diagram of a system (a SAS domain) embodying features and aspects hereof to spin-up all disk drives in a storage system having a heterogeneous mix of SAS and SATA disk drives.

FIG. 1 is a block diagram showing a system 100 embodying features and aspects hereof. The elements of system 100 as shown in FIG. 1 may be integrated within a storage subsystem or may be separated such that portions of system 100 reside in attached host systems and other portions reside in a storage subsystem or component. System 100 may include a storage controller 102 that serves in the role of a SAS initiator (e.g., an SSP, SMP, and/or STP initiator) for establishing connections with one or more storage devices and for exchanging information therewith. SAS disk drive 1114, SATA disk drive 118, and SATA disk drive 122 all represent target devices (e.g., SSP, SMP, and/or STP targets) with which the storage controller 102 may establish connections and exchange information. Storage controller 102 and the various disk drive target devices (114, 118, and 122) may be coupled through associated ports of one or more SAS expanders 110 and 112. As shown in FIG. 1, storage controller 102 to has at least one communication path coupled to each of the redundant pair of SAS expanders 110 and 112. Each SAS expander 110 and 112 has an associated communication path coupling it to each of the disk drive target devices (114, 118, and 122). Thus, storage controller 102 has a fully redundant pair of communication paths to each of the multiple disk drive target devices through the redundant pair of SAS expanders 110 and 112.

As is a generally known in the art, SAS disk drive 114 inherently includes dual ported capabilities to allow SAS disk drive 114 to be coupled to each of the redundant pair of SAS expanders 110 and 112. Further, as generally known in the art, SATA disk drives do not inherently include such a feature for dual port connectivity. Rather, a SATA interposer circuit may be associated with each SATA disk drive to provide, among other things, dual port connectivity to one or more storage controller devices (e.g., through one or more SAS expander ports). As shown in FIG. 1, SATA interposer 116 provides such dual port connectivity for SATA disk drive 118 while SATA interposer 120 provides such dual port, connectivity for SATA disk drive 122.

As noted above, each SATA interposer 116 and 120 preferably includes a programmable power switch 117 and 121, respectively. Programmable power switch 117 and 121 each may comprise a field effect transistor ("FET") suitable for controllably switching power on and off applied to the attached SATA disk drive 118 and 122, respectively. Programmable power switch 117 and 121 also may include suitable logic for receiving an instruction or signal to controllably apply or remove power to the associated SATA disk drive 118 and 122, respectively. Still further, programmable power switch 117 and 121 may preferably include a configurable feature to specify whether power should be initially applied to the attached SATA disk drive 118 and 122, respectively, when power is initially applied to the associated interposer 116 and 120, respectively. In other words, each SATA disk drive 118 and 122 may be configured through its corresponding interposer 116 and 120, respectively, to be initially powered on or powered off when power is initially applied to system 100.

As noted above, it is an ongoing problem in large storage systems to assure that the current draw associated with spinning up multiple disk drives in a large storage system does not exceed maximum available electrical current for the storage system. Conversely, by ensuring that the current draw is limited, smaller, less complex, less costly power supplies may be utilized in the system 100. Further as noted above, all SAS disk drives and some SATA disk drives are capable of supporting controlled spin-up processing such that although power is applied, the increase current draw associated with spinning-up the disk drives may delayed and initiated under control of the storage controller 102 and/or the SAS expanders 110 and 112. SAS disk drives (e.g., SCSI disk drives) inherently support such a feature as a standard aspect of the SCSI specifications. SATA disk drives which support staggered spin-up (e.g., generally those compliant with the SATA version 2 specifications) also allow for such controllable spin-up. By contrast, other SATA drives (generally those compliant with SATA specifications predating version 2) do not support staggered spin-up and thus present a continuing challenge for system designers to avoid substantial current surges when all such older SATA drives start spinning-up without controlled sequencing.

In accordance with features and aspects hereof, all disk drives in system 100 are logically grouped into one of two portions of the plurality of disk drives. A first portion 150 includes all SAS drives and SATA drives that are configured to permit controlled spin-up. In other words, the first portion 150 is a group of the plurality of disk drives that logically includes all SAS drives and any SATA drives that support staggered spin-up. A second portion 160 of the plurality of disk drives of system 100 includes all SATA disk drives that do not support staggered spin-up. The programmable power switch of the interposer associated with each SATA disk drive in the first portion 150 may therefore be configured to apply power to the attached SATA disk drive commensurate with the application of power to the system 100. By contrast, the programmable power switch of the interposer attached to each SATA disk drive in the second portion 160 is configured to initially deny power to the attached SATA disk drive since the drive does not support a staggered spin-up. This configuration of the SATA interposers' programmable power switch allows controllable sequencing of the spin-up of all SAS and SATA drives in the first portion 150. Further, system 100 may control the spin-up of all SATA drives in the second portion 160 by controllably programming the programmable power switch of the SATA interposer attached to each SATA disk drive of the second portion 160.

Processing within system 100 may therefore controllably sequence the spin-up of the SAS and SATA disk drives as in the first portion 150 as well as the SATA disk drives in second portion 160. In general, spin-up of the disk drives in the first portion 150 may be performed as an aspect of the SAS discovery processing normally performed within system 100 (e.g., in a SAS domain system). Such a discovery process may be performed either within the storage controller 102 (e.g., by a SAS initiator) or may be performed within any of the SAS expanders 110 and 112. The SAS discovery process generally identifies each device within the SAS domain (e.g., within system 100). The process of identifying a SAS disk drive 114 and a SATA disk drive 118 within first portion 150 will cause the spin-up of the identified disk drives. Standard processing within a discovery process limits the number of devices "N" discovered over any particular time duration "M". The number of devices to be discovered over a period of time and may be programmed as parameters in the device responsible for performing the SAS discovery processing. Thus, devices spun up in the SAS discovery processing will naturally limit the current draw due to the inherent limitation of discovering no more than N disk drives over a period of time of duration M.

Other processing within system 100 may then continue following the completion of the discovery process to controllably spin-up additional devices in the second portion 160. As noted above, the SATA interposer 120 associated with each SATA disk drive 122 in the second portion 160 is configured to deny power to the SATA disk drive 122 until instructed to apply power by processing in the storage controller or other component of system 100. The SAS discovery process may identify a SATA device by identifying the SATA interposer with power applied thereto but it cannot inquire further of the SATA disk drive attached to the interposer in the second portion because power is denied to the disk drive until after the SAS discovery process completes. Additional processing operable, for example, within storage controller 102 may then in a timely, sequential, controlled manner cause power to be applied to each SATA disk drive 122 coupled to a corresponding SATA interposer 120 within second portion 160. A suitable command or signal may be directed to the interposer 120 in the second portion 160 to cause the programmable power switch 121 to enable application of power to the attached SATA disk drive 122. Further, the additional processing performed, for example, within storage controller 102 may ensure that the orderly sequencing of the application of power to SATA disk drives in second portion 160 may adhere to the same rule that no more than N disk drives may be enabled to spin-up over a time period of duration M. Thus, processing in accordance with features and aspects hereof perform orderly, sequential spin-up of all disk drives in storage system 100 whether performed as an aspect of the SAS discovery processing or through additional processing in accordance with features and aspects hereof.

Those of ordinary skill in the art will readily recognize that any number of SAS disk drives, and/or SATA disk drives as may be configured in the first portion 150 and that any number of SATA disk drives as may be configured in the second portion 160 of system 100. Further, any number of SAS expanders may be provided in such a system to permit flexible scalability and redundancy configurations for larger storage systems. Still further, those of ordinary skill in the art will recognize that any number of storage controllers (SAS initiators) may be configured in such a system commensurate with the needs of a particular application. In addition, those of ordinary skill in the art will readily recognize that the storage controller 102 of system 100 may be integral within the storage subsystem or may be separate and distinct from the storage subsystem and integrated within one or more host systems coupled to the storage system. Thus, FIG. 1 is intended to be merely suggestive of any such storage systems having a plurality of disk drives and capable of supporting SAS disk drives, SATA disk drives that support staggered spin-up, and SATA disk drives that do not support staggered spin-up all in accordance with features and aspects hereof. In other words, FIG. 1 represents any systems adapted to support a heterogeneous mix of SAS and SATA disk drives and adapted to provide the controlled spin-up of all disk drives in such a system in accordance with features and aspects hereof.

Figure 2:
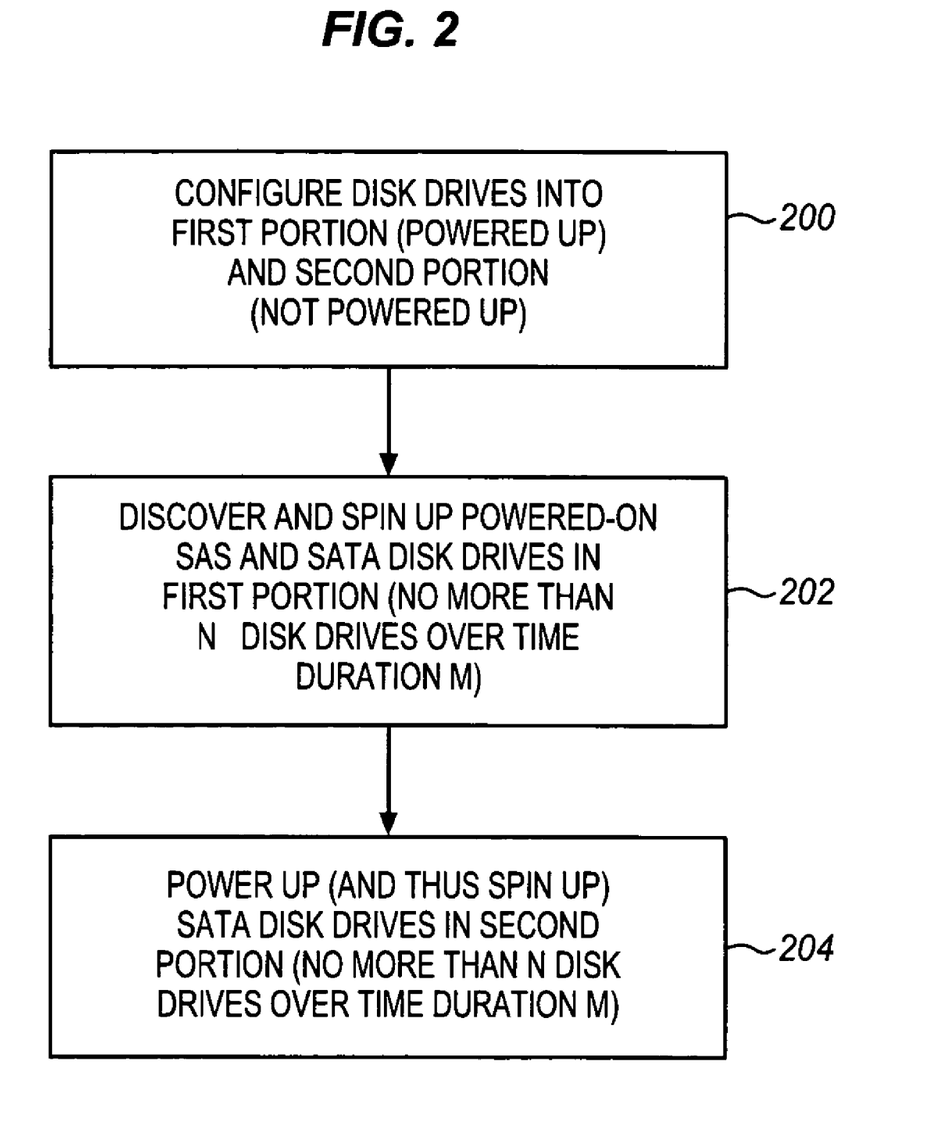
FIG. 2 is a flowchart describing an exemplary method in accordance with features and aspects hereof to controllably spin-up all disk drives of a storage system in accordance with features and aspects hereof.

FIG. 2 is a flowchart describing a method in accordance with features and aspects hereof to controllably spin-up all drives in a storage system having a heterogeneous mix of SAS disk drives, SATA disk drives that support staggered spin-up, and SATA disk drives that do not support staggered spin-up. Element 200 is first operable to configure or logically group all disk drives of the storage system into a first portion and a second portion. The logical configuration or grouping of all disk drives in the storage system further entails configuring those disk drives in the first portion to be powered up when power is initially applied to the storage system and further entails assuring that disk drives as in the second portion will not be powered up when power is initially applied to the storage system. Thus, disk drives logically grouped into the first portion are those disk drives that will be spun up in response to a discovery process performed within the SAS storage system. Disk drives logically grouped in the second portion are those disk drives that do not allow for controllable spin-up other than through the controlled application of power and thus will remain powered off at initial power-up of the storage system until further processing controls the sequencing for power-up and associated spin-up of the drives in the second portion.

Element 202 is next operable to perform a SAS discovery process and thereby cause the orderly spin-up of all powered on SAS and SATA disk drives logically grouped in the first portion of the storage system. It is common in design of SAS/SATA storage systems that control logic is used in conjunction with a SAS Discovery process to assure that no more than N disk drives may be discovered and hence spun up over any time period of duration M. Thus, the maximum current draw due to disk drives simultaneously spinning-up may be controlled such that no more than a predetermined, configurable number of disk drives (N) will start spinning over any particular duration of time (M). During this discovery process, all disk drives in the second portion, those that do not support SATA staggered spin-up, remain powered off and do not participate in the discovery process. However, as noted above, the SATA interposer attached to each SATA disk drive in the second portion may be powered on and may respond to SAS discovery process exchanges. Thus, the existence of some SATA device may be known in the discovery process for each disk drive in the second portion, but the details of that drive will remain unknown to the system until further processing is completed.

Element 204 is then operable to controllably power-up and thus spin-up each of the SATA disk drives as in the second portion. Processing of this element 204 may also ensure that no more than N disk drives are spun up over any time period of duration M. Thus, element 204 controllably sequences the spin-up and hence limits the current draw associated therewith for all SATA disk drives as in the second portion of the plurality of disk drives of the storage system.

The method of FIG. 2 therefore assures that all disk drives of the storage system are controllably spun up so that current draw associated with spin-up of disk drives may be controlled and sequenced to maintain current draw a within a desired allowable range. By so controlling current draw for a storage system, power supplies may be designed in the storage system in a manner to utilize simpler, lower cost, smaller capacity power supplies.

Figure 3:
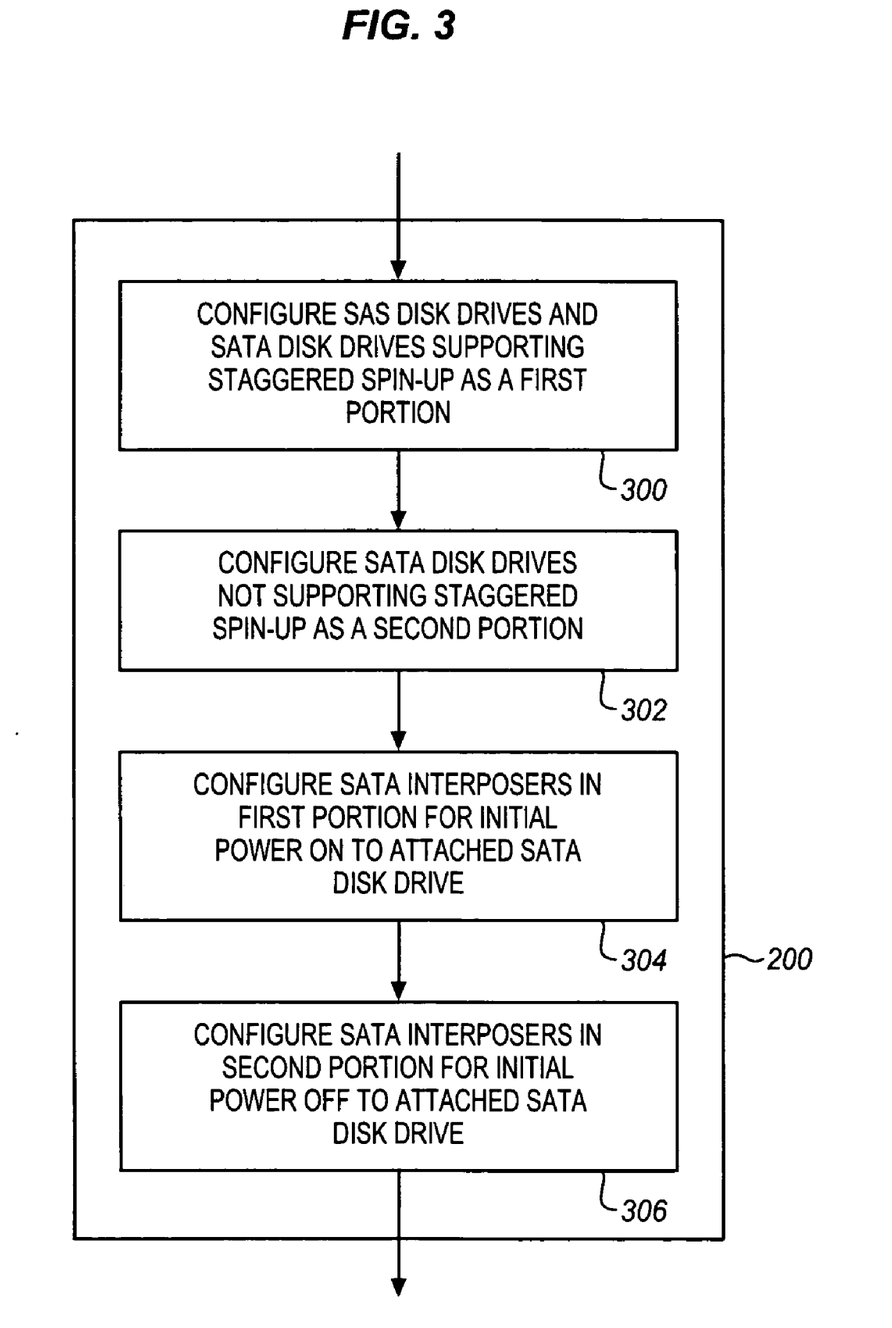
FIGS. 3, 4, and 5 are flowcharts describing exemplary additional details of aspects of the method of FIG. 2.

FIG. 3 is a flowchart providing exemplary additional details of the processing of element 200 of FIG. 2 to configure and logically partition all disk drives of the storage system into a first portion and a second portion. As noted above, those disk drives logically configured in the first portion of the plurality of disk drives are either SAS drives that inherently support controlled spin-up or are SATA drives designed to support the staggered spin-up feature specified in the SATA version 2 specifications. Those disk drives logically grouped into the second portion are SATA disk drives that do not provide support for the staggered spin-up feature of the SATA version 2 specifications.

Element 300 is first operable to configure all SAS drives disk drives of the storage system and all SATA disk drives supporting staggered spin-up as logically grouped in a first portion of the plurality of disk drives. Step 302 then logically configures all SATA disk drives that do not support staggered spin-up as a second portion logical grouping of disk drives. The configuration steps of element 300 and 302 need not be actually performed but may merely represent logical grouping or configuration of disk drives of a storage subsystem. In general, disk drives in the first portion are those disk drives that are adapted to power on upon application of power to the storage system whereas those disk drives in the second portion are disk drives configured to be powered off upon initial application of power to the storage system. As noted above, SATA disk drives may be coupled to the storage system using a SATA interposer with a programmable and configurable power switch used for controllably applying power to the SATA disk drives coupled to each SATA interposer. Element 304 is therefore representative of processing to configure all SATA interposers in the first portion to enable immediate application of power to the attached SATA disk drives upon power-up of the storage system. SATA disk drives in the first portion are those that support staggered spin-up and therefore will not initiate spin-up processing upon application of power. Such processing may entail manual processing such as configuring a jumper or switch on the SATA interposer or may entail automated programmatic configuration steps performed by an administrator when a storage system is populated with disk drives. An appropriate configuration command sequence or signal may be applied to the SATA interposer indicating that it should immediately apply power to the attached SATA drive or defer application of power. Such a configuration command or signal and associated non-volatile storage of such a configuration in the SATA interposer may be performed utilizing well known techniques and logic components.

Element 306 represents similar manual or automated configuration processing of the SATA interposers in the second portion of the storage system such that each SATA interposer in the second portion is configured to deny power to the attached SATA disk drive when power is initially applied to the storage system. As noted above, disk drives in the second portion are those SATA disk drives that do not support SATA staggered spin-up. Thus, SATA disk drives in the second portion should not be spun up immediately upon application of power to the storage system but rather under control of other processing discussed further herein.

Those of ordinary skill in the art will readily recognize that the configuration steps of element 200 as exemplified in more detail in FIG. 3 could be performed as manual configuration steps and/or as automated processing (or a combination of manual and automated processing) to configure interposers in both the first portion and second portion of the storage system. Further, the configuration steps of elements 300 and 302 to logically group each disk drive either in the first portion or the second portion can be performed simply as recognizing disk drives that are configured to immediately power-up such as in the SAS discovery processing. Disk drives that are in the second portion configured to be denied power at initial system power-up will not be completely identified and initialized by the SAS discovery process. Rather, those disk drives that are not fully identified by the SAS discovery processing are thereby identified as logically grouped in the second portion of disk drives of the storage system. Those of ordinary skill in the art will readily recognize a variety of manual and/or automated processing steps to provide the configuration processing of FIG. 3.

Figure 4:
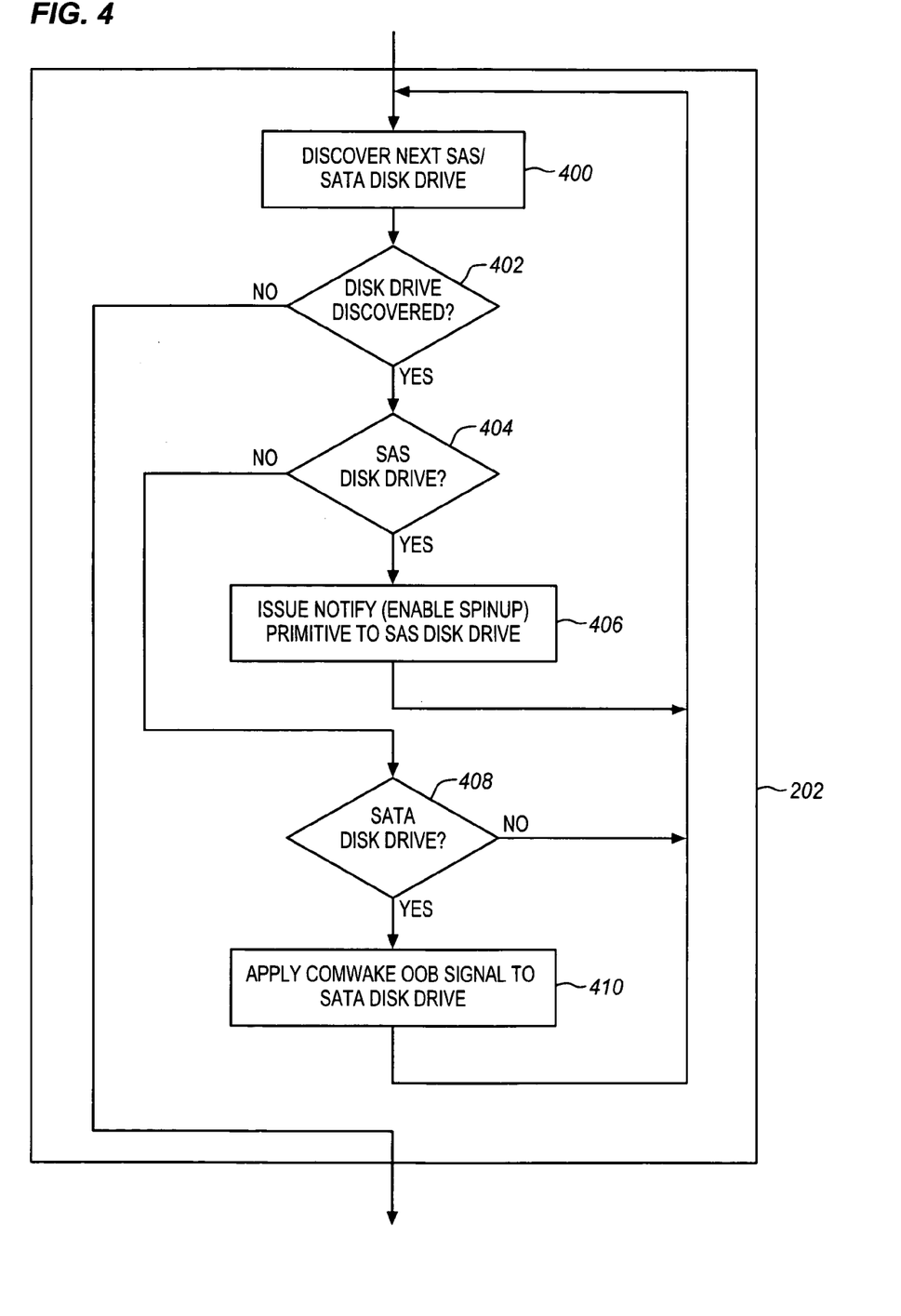

FIG. 4 is a flowchart providing exemplary edition of details of the processing of element 202 of FIG. 2. Element 202 of FIG. 2 is generally operable to perform SAS discovery processing and to thereby enable spin-up of each SAS and/or SATA disk drives in the first portion of the plurality of disk drives of the storage system. Elements 400 through 410 are iteratively operable for each SAS or SATA disk drive powered on and discovered by the discovery processing. Element 400 is first operable to discover a next SAS or SATA disk drive in the storage system. Devices in the first group (e.g., those that are immediately powered on) may be discovered by this processing. Those of ordinary skill in the art are well aware of standard SAS processing utilized to perform discovery of devices in a SAS domain system in accordance with the SAS specifications. Element 402 is then operable to determine whether a next SAS or SATA disk drive has been so discovered by processing of element 400 or if all powered-up disk drives as have been discovered by the SAS discovery process. If no new disk drive has been discovered by processing of element 400, element 402 completes processing of element 202. If element 402 determines that a new disk drive has been discovered by processing of element 400, element 404 is next operable to determine whether the newly discovered disk drive is a SAS disk drive. If not, processing continues at element 408 as discussed below. If so, element 406 is next operable to issue a NOTIFY (ENABLE SPINUP) primitive to the newly discovered SAS disk drive to thereby enable spin-up of the SAS disk drive. Processing then continues looping back to element 400 to await discovery of the next SAS or SATA disk drive in the storage system. If the newly discovered disk drive is not a SAS disk drive as determined by element 404, element 408 is next operable to determine whether the newly discovered disk drive is a SATA disk drive. If not, processing continues looping back to element 400 two await discovery of the next SAS or SATA disk drive. If so, element 410 is next operable to apply a COMWAKE out of band signal to the newly discovered SATA disk drive to thereby enable spin-up of the disk drive. Processing then continues looping back to element 400 to await discovery of the next SAS or SATA disk drive.

Those of ordinary skill in the art will readily recognize a variety of other processing associated with the standard SAS discovery process. Such additional processing is well known to those of ordinary skill in the art and thus eliminated from the processing of FIG. 4 for the sake of brevity in this description. Further, those of ordinary skill in the art will readily recognize that the standard SAS discovery processing as represented by element 400 may include appropriate throttling or pacing parameters to assure that no more than N disk drives are discovered or spun up during any period of time of duration M. Typical implementation of SAS discovery processing includes parameters that may define values for N and M to appropriately adapt the discovery process to the current draw limitations of a particular SAS storage system. Still further, those of ordinary skill in the art will readily recognize a variety of equivalent method steps to those depicted in FIG. 4 and capable of providing similar processing to spin-up all disk drives in a first portion of the plurality of disk drives in a storage system.

Figure 5:
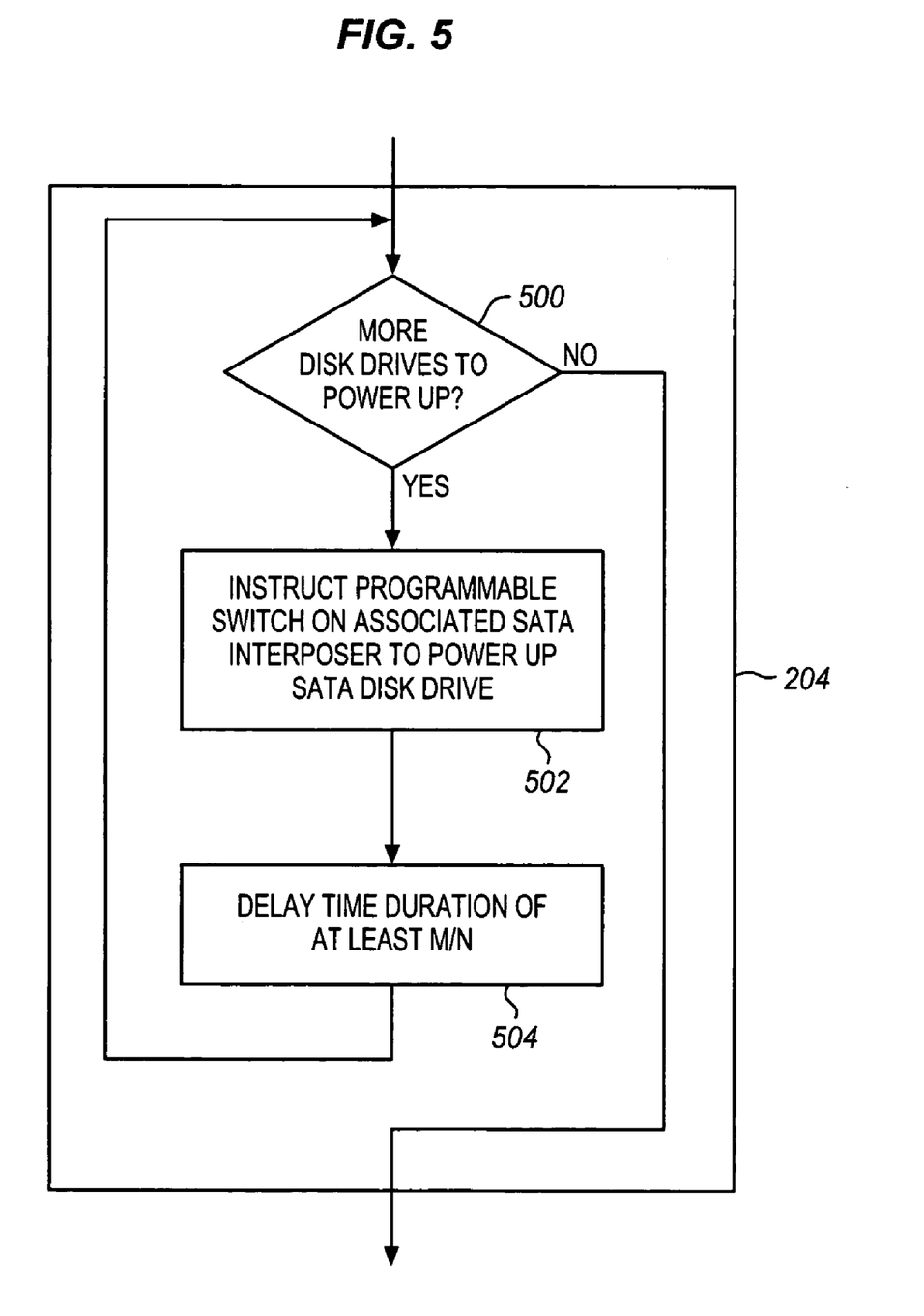

FIG. 5 is a flowchart providing exemplary additional details of the processing of element 204 of FIG. 2 above. Element 204 of FIG. 2 above is generally operable to controllably sequence the spin-up all SATA disk drives in the second portion of the plurality of disk drives of the storage system by controllably sequencing the application of power to each SATA disk drive in the second portion. As noted above, each SATA disk drive in the storage system is coupled to a corresponding SATA interposer that includes a programmable power switch (e.g., a FET capable of switching adequate current to the SATA drive) and associated logic components to allow an external signal or command to control the FET to apply power to the attached SATA disk drive.

Element 500 of FIG. 5 is first operable to determine whether more disk drives remain to be powered up in the second portion of the plurality of disk drives of the storage system. If not, processing of element 204 is complete. If so, element 502 is next operable to appropriately instruct the programmable power switch on an associated SATA interposer for the SATA disk drive to controllably apply power to the SATA disk drive coupled thereto. Element 504 is then operable to impose a delay of a duration of at least M/N where N and M are parameters as defined above in the SAS discovery process. The delay of element 504 helps assure that no more than N disk drives will be spun up over any period of time of duration M. Processing then continues looping back to element 500 to continue processing other SATA disk drives in the second portion of the plurality disk drives in the storage system.

Those of ordinary skill in the art will readily recognize a variety of equivalent method steps to perform the processing of element 204 to controllably enable application of power to SATA disk drives in the second portion to thus control sequencing of spin-up of disk drives in the second portion.

Figure 6:
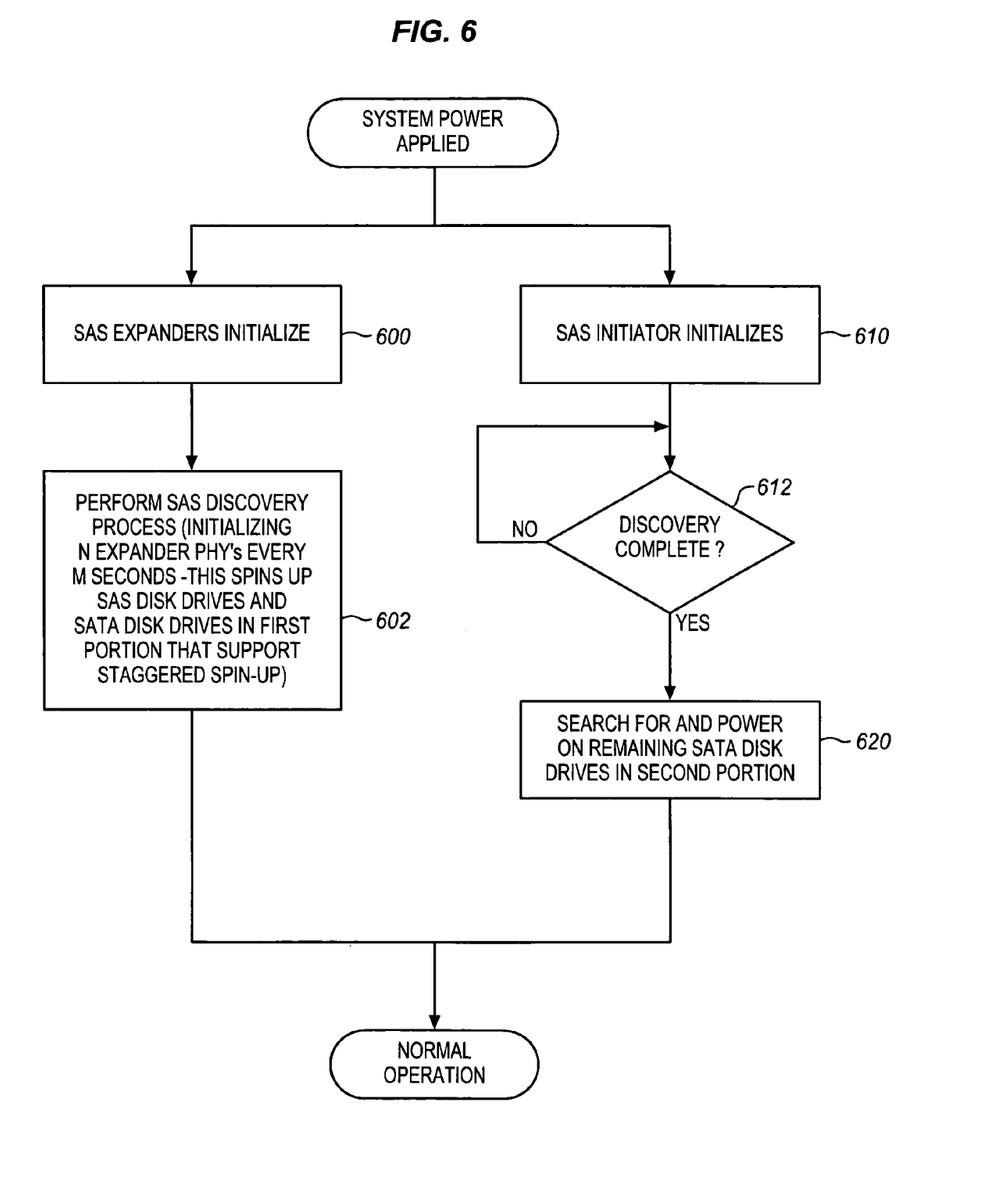
FIG. 6 is a flowchart describing an exemplary method in accordance with features and aspects hereof to controllably spin-up all disk drives of a storage system in accordance with features and aspects hereof.

FIG. 6 is a flowchart broadly describing another method in accordance with features and aspects hereof to controllably spin-up all disk drives in a storage system having a heterogeneous mix of SAS disk drives, SATA disk drives supporting staggered spin-up, and SATA disk drives that do not support staggered spin-up. As generally noted above, all disk drives of a storage system may be logically grouped into either a first portion or a second portion. Those logically grouped in the first portion are all SAS disk drives in the storage system and all SATA disk drives in the storage subsystem that support staggered spin-up. Disk drives in the second portion are all SATA disk drives that do not support staggered spin-up. The processing of the flowchart of FIG. 6 represents substantially concurrent processing within a SAS expander of the storage system and a SAS initiator or storage controller of the storage subsystem. Responsive to the initial application of power to the storage subsystem elements 600 and 610 represent the substantially simultaneous or concurrent processing within a SAS expander of the storage system and a SAS initiator or storage controller of the storage system, respectively.

When the SAS initiator or storage controller completes its initialization, element 612 is then operable within the SAS initiator or storage controller to await completion of a SAS discovery process performed within the SAS expander of the storage system. Thus, processing of the SAS initiator storage controller is paused at element 612 (as regards this aspect of initialization) waiting for completion of concurrent processing within a SAS expander of the storage system.

Element 602 represents processing within a SAS expander, having completed basic initialization at element 600, to perform a SAS discovery process. As generally known in the art, a SAS discovery process identifies all devices in the SAS storage system. The process of identifying disk drives in such a SAS storage system also includes enabling spin-up of each disk drives of powered up and thus discovered by the SAS discovery process. Further, a SAS discovery process will discover and enable spin-up of SATA disk drives that support staggered spin-up. Therefore, processing of element 602 represents a completed SAS discovery process that inherently causes spin-up of all SAS disk drives and SATA disk drives that support staggered spin-up.

Upon completion of the SAS discovery process, processing within the SAS expander of the storage system is completed and normal operation commences. Simultaneously, the SAS initiator or storage controller may then continue processing following the delay of element 612 and element 620 will then be operable to complete the controlled power-up and spin-up of all disk drives in storage system. In particular, element 620 is operable to send appropriate commands or signals to the interposer attached to each SATA disk drive in the second portion logical grouping of the plurality of disk drives in the storage system. An appropriate signal or command directed to each interposer in a controlled, sequenced manner will cause the spin-up of each remaining disk drive of the storage system. The signal or command controllably applies power to each disk drive in the second portion. Each disk drive in the second portion will then commence spinning-up. Upon completion of processing of element 620, the SAS initiator or storage controller commences normal operation and the storage system is fully initialized with all disk drives powered on and spinning.

Those of ordinary skill in the art will readily recognize that the processing of FIG. 6 is intended to demonstrate that the processing of the storage system may be separated such that some processing is performed within the SAS initiator or storage controller of the storage system while other processing may be performed within one or more SAS expanders of the storage system. Those of ordinary skill in the art will readily recognize a variety of equivalent method steps that may be distributed between the SAS initiator and SAS expanders of a storage system to perform the requisite initialization and spin-up of the storage system and its plurality of disk drives.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method of sequencing the spin-up of a plurality of disk drives in a storage system, the plurality of disk drives including at least one serial attached SCSI ("SAS") disk drive and at least one serial advanced technology attachment ("SATA") disk drive, the method comprising:
   performing a discovery process to identify each SAS disk drive in the plurality of disk drives;
   configuring a first portion of the disk drives to be powered on when the storage system is powered on the first portion including at least one SAS disk drive;
   configuring a second portion of the disk drives to be initially powered off when the storage system is powered on the second portion including at least one SATA disk drive;
   issuing a spin-up command to each disk drive in the first portion; and
   controllably applying power to each disk drive in the second portion to cause said each disk drive in the second portion to spin-up.

2. The method of claim 1
   wherein the step of issuing further comprises issuing spin-up commands to effectuate spinning-up of at most a number of disk drives N in the first portion over any predetermined period of time of duration M.

3. The method of claim 2
   wherein the step of controllably applying power further comprises controllably applying power to said each disk drive in the second portion such that at most N disk drives in the second portion spin-up over any period of time of duration M.

4. The method of claim 1 wherein the step of issuing is performed in cooperation with the step of performing a discovery process.

5. The method of claim 1
   wherein the step of issuing further comprises issuing a NOTIFY (ENABLE spin-up) primitive to each identified SAS disk drive in the first portion.

6. The method of claim 1
   wherein the step of performing a discovery process identifies one or more SATA disk drives, and
   wherein the step of issuing further comprises applying a COM WAKE out of band signal to each identified SATA disk drive in the first portion.

7. The method of claim 1
   wherein the plurality of disk drives comprises one or more SATA disk drives and wherein each SATA disk drive is coupled to a SATA interposer with a programmable power switch adapted to controllably apply power to the SATA disk drive coupled thereto,
   wherein the step of configuring the first portion of the plurality of disk drives further comprises configuring the programmable power switch of each SATA interposer coupled to a SATA disk drive in the first portion to be initially on,
   wherein the step of configuring the second portion of the plurality of disk drives further comprises configuring the programmable power switch of each SATA interposer coupled to a SATA disk drive in the second portion to be initially off, and
   wherein the step of controllably applying power further comprises controllably switching on the programmable power switch of each SATA interposer coupled to a SATA disk drive of the second portion.

8. A storage system comprising:
   a storage controller; and
   a serial attached SCSI ("SAS") expander coupled to the storage controller; and
   a plurality of disk drives each coupled to the SAS expander, the plurality of disk drives including a first portion configured to have power applied when the system is powered on, the plurality of disk drives further including a second portion configured to remain initially powered off when power is applied to the system, the first portion including at least one SAS disk drive, the second portion including at least one serial advanced technology attachment ("SATA") disk drive,
   wherein the storage controller is adapted to perform a SAS discovery process to identify SAS disk drives and SATA disk drives in the plurality of disk drives, and
   wherein the storage controller is adapted to issue a spin-up command to each disk drive in the first portion and is further adapted to controllably apply power to spin-up each disk drive in the second portion.

9. The system of claim 8 wherein the storage controller is further adapted to issue a spin-up command to at most a number of disk drives N over a predetermined period of time of duration M.

10. The system of claim 9 wherein the storage controller is further adapted to controllably apply power to each disk drive in the second portion such that at most N disk drives spin-up over time of duration M.

11. The system of claim 8
    wherein the plurality of disk drives includes one or more SAS disk drives and includes one or more serial ATA ("SATA") disk drives,
    wherein the system further comprises a one or more SATA interposers each coupled to a corresponding SATA disk drive of the plurality of disk drives and coupled to the SAS expander and wherein each interposer includes a programmable power switch adapted to controllably apply power to the corresponding SATA disk drive.

12. The system of claim 11
    wherein the storage controller is adapted to issue a NOTIFY (ENABLE spin-up) primitive to each SAS disk drive in the first portion,
    wherein the storage controller is further adapted to apply a COM WAKE out of band signal to each SATA disk drive in the first portion, and
    wherein the storage controller is further adapted to controllably program the power switch of each interposer coupled to a SATA disk drive in the second portion to controllably apply power to each SATA disk drive in the second portion.

13. A method operable in a storage system having a serial attached SCSI ("SAS") storage controller coupled to a plurality of disk drives including at least one SAS disk drive and at least one serial advanced technology attachment ("SATA") disk drive, the plurality of disk drives comprising a first portion of disk drives that support controlled spin-up following power-up and a second portion of disk drives that do not support controlled spin-up following power-up, the method comprising:

performing a SAS discovery process to identify disk drives in the storage system such that each disk drive in the first portion is controllably spun up during the discovery process; and controllably powering up the disk drives in the second portion following completion of the discovery process.

14. The method of claim 13
wherein the storage system comprises a SAS storage controller and a SAS expander,
wherein the step of performing a SAS discovery process is performed within the SAS expander, and
wherein the step of controllably powering up is performed within the SAS storage controller.

15. The method of claim 13
wherein the storage system includes at least one SATA interposer such that each SATA disk drive of the storage system is coupled to a corresponding SATA interposer, each interposer including a programmable power switch configurable to apply power to the corresponding SATA disk drive when power is applied to the SATA interposer and configurable to await instruction from the storage controller to apply power to the corresponding SATA disk drive,
wherein the step of controllably powering up the disk drives in the second portion further comprises instructing the SATA interposer coupled to each SATA disk drive in the second portion to apply power to its corresponding SATA disk drive to spin-up its corresponding SATA disk drive.

16. The method of claim 13
wherein the step of performing a SAS discovery process further comprises:
identifying each disk drive in the first portion as either a SAS disk drive or a SATA disk drive supporting staggered spin-up;
issuing a NOTIFY (ENABLE spin-up) primitive to each SAS disk drive in the first portion; and
applying a COM WAKE out of band signal to each SATA disk drive in the first portion to cause spin-up of said each SATA disk drive.

17. The method of claim 13
wherein each SATA disk drive of the plurality of disk drives is coupled to a SATA interposer having a programmable switch to apply power to the attached SATA disk drive and configurable to apply power to the attached SATA disk drive when power is applied to the interposer and configurable to await instruction from the storage controller to apply power to the attached SATA disk drive,
wherein the method further comprises:
configuring all SATA interposers coupled to SATA disk drives in the first portion to apply power to the attached SATA drive when power is applied to the SATA interposer; and
configuring all SATA interposers coupled to SATA disk drives in the second portion to await instruction from the storage controller to apply power to the attached SATA disk drive.

18. The method of claim 13 wherein the steps of performing a SAS discovery process and of controllably applying power result in no more than a number N disk drives being spun up during any time period of duration M.

19. The method of claim 13 wherein N and M are configurable values in the storage system.

* * * * *